Dec. 18, 1962  M. E. BOURNS  3,068,700
PRESSURE RESPONSIVE INSTRUMENTS
Original Filed April 25, 1955
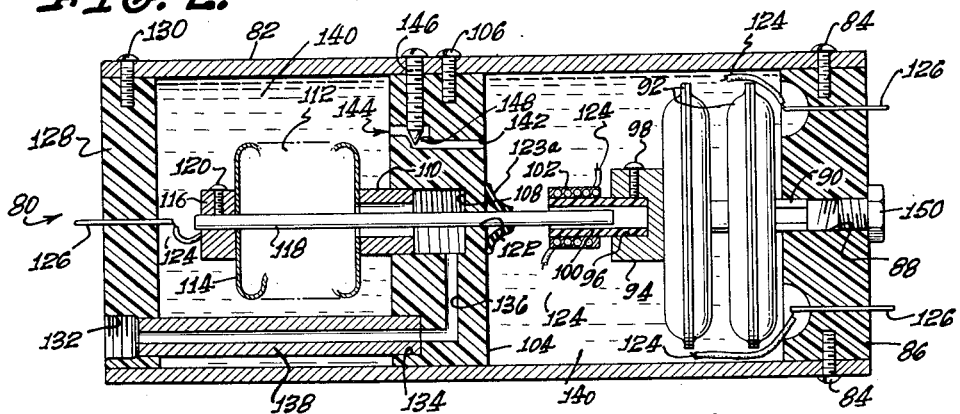
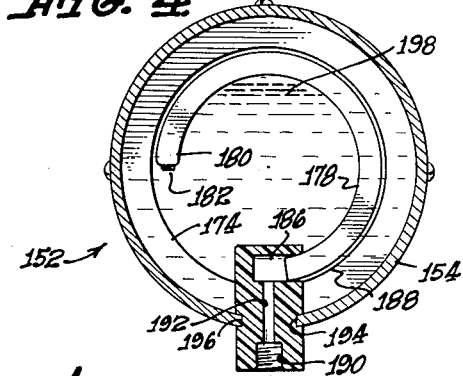
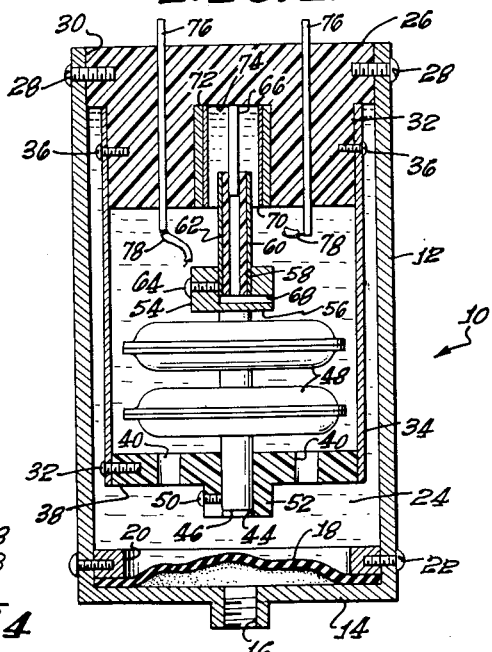
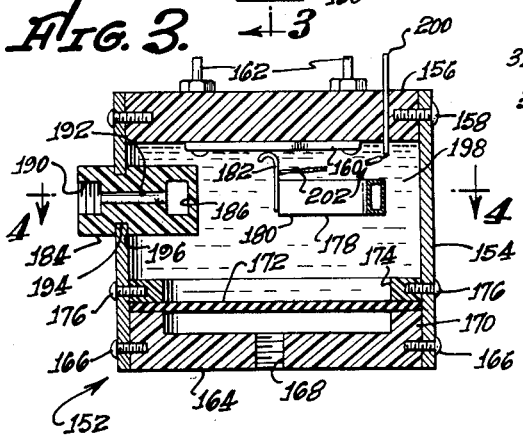
INVENTOR.

United States Patent Office 3,068,700
Patented Dec. 18, 1962

3,068,700
PRESSURE RESPONSIVE INSTRUMENTS
Marlan E. Bourns, 2482 Carlton Place, Riverside, Calif.
Original application Apr. 25, 1955, Ser. No. 503,648. Divided and this application Sept. 29, 1959, Ser. No. 843,613
10 Claims. (Cl. 73—398)

This invention relates to pressure responsive instruments, and is a division of my pending application, Serial No. 503,648, filed April 25, 1955, entitled Pressure Responsive Electrical Instruments (now abandoned).

In the manufacture, development, testing, and use of guided missiles, aircraft and other various equipment it is necessary to measure fluid pressures with a high degree of accuracy. Such measurements must usually be made under conditions of severe vibration, great acceleration, and shock. Frequently, such instruments used for this purpose are subjected to various corrosive conditions.

In the past a wide variety of devices have been developed for measuring fluid pressures so as to obtain an electrical signal which varies linearly with variation of the pressure being measured. Instruments for this purpose have been developed utilizing all sorts of pressure-responsive members, such as peculiarly shaped bellows, Bourdon tubes, or the like, coupled to a movable member of an electrical device. Electrical devices which are used with the pressure responsive mechanism include potentiometers, slug tuned coils, capacitors and the like. Although many of these prior art instruments have been comparatively successfully used, they still do not meet the extreme requirements of the present day and age with respect to resistance to vibration, acceleration error, shock, corrosive influence, and the like. Also these prior art instruments do not even under comparatively normal conditions, as a general rule, exhibit the high degree of accuracy presently required.

The present invention provides a pressure-sensitive instrument capable of providing an electrical output signal that is a determinable function of the difference between the respective pressures exhibited by two separated bodies of fluid, and which instrument is relatively simple and susceptible of inexpensive construction and which is very insensitive to accelerations and corrosive agents. These ends are attained by, among other things, making the instrument body of simple cylindrical configuration, by utilizing liquid damping of moving parts, by so constructing movable means that their effective density is the same as that of the ambient fluid, and by employing two co-operative electrical devices each of which is connected to a respective pressure-sensitive element for actuation thereby and constructed and arranged for providing an electrical signal representative of changes of fluid pressure sensed by the pressure-sensitive devices.

It is an object of this invention to provide pressure responsive instruments which are comparatively simple in construction, which can be manufactured at relatively low cost, and which are not adversely affected to any material extent by severe vibration, shock, acceleration, or corrosive influences. A further object of this invention is to provide pressure-responsive electrical instruments of the class herein described which are exceedingly accurate when used under virtually any conditions.

Other objects and advantages of the invention will become apparent to those skilled in the art upon consideration of the following detailed description of embodiments thereof illustrated in the drawings, wherein:

FIGURE 1 is a side cross sectional view of a pressure responsive instrument of the invention;

FIGURE 2 is a side cross sectional view similar to FIGURE 1 of a modified pressure responsive instrument of the invention;

FIGURE 3 is a side cross sectional view of a second modified pressure responsive instrument of the invention, taken at a plane indicated by line 3—3 of FIGURE 4; and FIGURE 4 is a cross sectional view, taken at 4—4 of FIGURE 3 of the drawings.

In FIGURE 1 of the drawings, the reference numeral 10 designates a pressure-responsive instrument embodying the principles of the invention, which instrument includes a can-like housing 12 having a bottom end 14 within which is located a tapped opening 16. This opening 16 is adapted to be connected to an appropriate line conveying fluid under pressure, although it is to be understood that if desired this opening may be left open to the atmosphere during certain uses of the instrument 10. Immediately above the bottom end 14 of the housing 12 there is located a slack flexible diaphragm 18 which serves to divide the housing 12 into two parts, the first of which is above this diaphragm, and the second part being located between the diaphragm and the bottom end 14. Preferably, the diaphragm 18 is of generally bowed or convex configuration, so that it may be held in position along its edges against the bottom end 14 through the use of a retaining ring 20 secured to the housing 12 through the use of screws 22. Suitable materials for forming the diaphragm 18 include natural rubber, neoprene, and the like. Such materials must, however, be chosen so that they are substantially unaffected by a dielectric liquid 24, such as mineral oil, contained within the housing 12 above the diaphragm 18.

This fluid 24 normally completely fills the area within the housing 12 between the diaphragm 18 and a non-conductive closure 26 mounted by means of screws 28 within the open end 30 of the housing 12. The closure thus completely seals the housing 12. Mounted upon a flange 32 projecting completely around the closure 26 is a cylindrical support 34. This support is attached to the closure 26 by screws 36, and in turn is used to carry a disc-shaped non-conductive support 38 having holes 40 formed therein so that the dielectric fluid 24 may readily flow into and out of the support 34 as required during the operation of the instrument 10, as the diaphragm 18 expands or contracts in accordance with the pressures conveyed to this diaphragm through the opening 16. The support 38 is attached to the support 34 by other screws 32, and is formed so as to have a center opening 44 formed therein.

This center opening is intended to be used in holding a projecting rod 46 which is attached to a bellows unit 48 of known design. The rod 46 is preferably secured to the support 38 through the use of a screw 50 which is mounted within a small boss 52 positioned upon the support 38 about the center opening 44. By this expedient, the position of the bellows unit within the instrument 10 may be adjusted and then locked in position by screw 50.

The bellows unit 48 is normally evacuated in the instrument 10. In order that the effective density of this bellows unit and attached parts may be the same as the density of the dielectric fluid 24 a small weight 54 is attached to the movable end 56 of the bellows unit 48 remote from the rod 46.

This weight 54 is preferably formed so as to have a cylindrical internal opening 58 formed therein to receive a cylindrical electrode 60 mounted on a tubular supporting member 62. The electrode 60 is secured to the weight 54 by a screw 64. During the operation of the instrument 10, the bellows unit 48 tends to expand or contract, moving this electrode 60 with respect to the support 34. Undesired sidewise motion of the electrode 60 is prevented by means of a small shaft 66 attached to the closure 26, which shaft slides relative to and within the support member 62. A passage 68 is formed within the weight 54 so as to be in communication with the center of this tubular support member 62, in order to prevent undesired effects resulting from the creation of pressure or a vacuum within the cylindrical support member 62.

During the motion of the free end of the bellows 48, the electrode 60 moves with respect to a second electrode 70 mounted on the inside of a small supporting sleeve 72, which is secured within a cylindrical cavity 74 in the closure 26. Electrically conductive leads 76 are held within the closure 26 so as to project therethrough, and these leads are connected to the electrodes 60 and 70 by wires 78. Thus, with this construction, as the bellows unit 48 expands or contracts under pressure transmitted to this bellows unit by the dielectric fluid 24 as a result of the diaphragm 18 moving, the electrodes 60 and 70 are moved with respect to one another. It will be recognized by those skilled in the art that these two electrodes constitute a complete capacitance unit and that each of these electrodes may be termed first and second electrical means. These two electrodes are at all times separated from one another by the dielectric fluid 24. If desired, however, a solid dielectric may be located between them.

In many cases it is desired to have an instrument of the category of the instrument 10 in which the motion of the two electrical means with respect to one another is greater than the movement of a single bellows type unit. Such a construction is shown in FIGURE 2 of the drawings. Here there is illustrated an electrical instrument 80 having a cylindrical housing 82 within one end of which is secured, through the use of screws 84, a disc-shaped non-conductive mount 86 having a central opening 88 formed therein. This opening 88 is preferably tapped so as to receive a threaded rod 90 projecting from one end of a bellows unit 92. The end of this bellows unit remote from the threaded rod 90 is movable with respect to the housing 82 and is secured to a weight 94, similar to the weight 54, having a cylindrical cavity 96 formed therein. A screw 98 is employed to hold within this cavity a non-conductive tubular support 100. Secured to the outer surface of this support 100 is a small inductance coil 102.

Located within the center section of the housing 82 is a nonconductive partition member 104, which is secured in position by screws 106. This partition member 104 is provided with a large, centrally located internal cylindrical cavity 108, which is preferably threaded so as to receive a threaded collar 110 forming a part of another bellows unit 112. This bellows unit 112 includes a movable end 114 upon which is mounted another collar 116. With this construction, a small ferromagnetic rod 118 is held by a screw 120 in the collar 116 so as to project from the movable end 114 completely through the bellows unit 112, the cavity 108 and another opening 122 within the partition member 104, out into the center of the cylindrical support 100. The rod 118 fits closely within the collar 116 and the opening 122, so that the bellows unit 112 and the cavity 108 are sealed. If desired, a thin flexible diaphragm 123a of rubber or the like may be secured to the partition member 104 and the rod 118 in order to prevent leakage. Other means may also be employed. The weight of the collar 116 may be so adjusted so as to vary the effective density of the bellows unit 112 in a similar manner in which the weight 54 of FIGURE 1 is used.

With this construction, as either the bellows unit 92 or the bellows unit 112 is caused to expand or contract the rod 118 will move within the coil 102, thereby varying the inductance of this coil. The rod 118 and the extremities of the coil 102 are electrically connected to external terminal leads 126 by wires 124, which extend through openings in end closures 86 and 128. End closure 128 is preferably made of dielectric material, and is secured within the end of the housing 82 remote from the disc 86 by screws 130.

The end closure 128 has a tapped hole 132 formed therein to receive one threaded end of a pipe 138. The other threaded end of the pipe 138 is screwed into a tapped hole 134 in partition member 104. The cavity 134 is connected with the cavity 108 by a passage 136 formed within the partition member 104. Thus, the interior of the bellows unit 112 is in communication with the opening 132 through the cavity 108, the passage 136 and the pipe 138. The opening 132 is adapted to be connected to a line carrying fluid pressure or it may be left open to the atmosphere. Alternatively, the opening 132 may be closed by a plug (not shown) when it is desired to have the interior of the bellows unit 112 evacuated or under a predetermined amount of pressure during the use of the instrument 80.

This entire instrument is preferably filled with a dielectric fluid 140, which is free to flow through a passage 142 located within the partition member 104. An appropriate needle valve 144 having an adjustable valve body 146 and a valve seat 148 is located within the partition member 104 so as to control the rate of flow through this passage 142. It is to be understood, however, that this needle valve 144 may be omitted, if so desired. During the operation of the instrument 80 the bellows unit 92 may be evacuated, or it may be filled with an appropriate fluid under pressure. In either of these cases a plug 150 is located within the central opening 88 in order to prevent the ingress or egress of fluid into or out of this bellows unit. If desired, however, the plug 150 may be omitted and the interior of this bellows unit 92 may be connected directly to the atmosphere or to an appropriate line or pipe for fluid under pressure.

The operation of the instrument 80 is essentially similar to the operation of the instrument 10 previously described. As one of the two bellows units 92 or 112 expands or contracts, dielectric fluid will be forced through the passage 142 from one side of the partition member 104 to the other side thereof. Such fluid will cause either expansion or contraction of the other of these bellows units. As a result of this, both of the bellows units will move in synchronism, and the coil 102 and the rod 118 will be moved in opposite directions with respect to one another through a distance greater than the length of travel of either of the bellows units alone. The rate of response or movement of the two bellows units will be governed by the amount of fluid moving through the passage 142. Thus, this passage 142 and the needle valve 144 provide an effective damping means to prevent undesired rapid movement of the coil 102 and the rod 118 with respect to one another.

Another modified form of the invention is illustrated in FIGURES 3 and 4 of the drawings. This embodiment, designated by reference numeral 152, is built within a cylindrical housing 154, one end of which is closed by a disc 156 of a non-conductive material. The disc 156 is held in position by screws 158, and carries on its inner surface an arcuate resistance layer 160 formed by appropriate printed circuit techniques. The ends of the resistance layer 160 are electrically connected to terminal posts 162, which project through the disc 156 to the outside of the instrument.

The other end of the housing 154 is provided with a generally disc-shaped closure 164 which is secured to this housing by screws 166. This closure 164 has a centrally formed tapped opening 168, and an internal cylindrical flange 170. Against the flange 170 a flexible diaphragm 172 of the same category as the diaphragm 18 of FIGURE 1 is held through the use of a retaining ring 174. This retaining ring is held with respect to the housing 154 by screws 176.

Between the diaphragm 172 and the disc 156 is a Bourdon tube 178 having a movable end 180 to which is attached a small resilient electrical contact 182 that bears against the resistance layer 160, moving with respect to this layer during the operation of the instrument 152 as the Bourdon tube 178 expands or contracts. The Bourdon tube itself is held within the housing by a non-conductive support 184 having an end cavity 186 formed therein to receive the fixed end 188 of this Bourdon tube. The cavity 186 is in communication with a tapped opening 190 formed within the support 184 through the use of a small internal passage 192. The entire support 184 is held by the portions of the housing 154 around an opening 194 within the housing engaging a circumferential groove 196 in the exterior of the support 184.

If desired, the tapped opening 190 may be connected to an appropriate source of fluid under pressure, or it may be left open to the atmosphere, or it may be closed through the use of a plug (not shown). It the latter case the Bourdon tube 178 may be either filled with a fluid under pressure, or it may be completely evacuated. A weight (not shown) is preferably attached to the movable end 180 of this Bourdon tube so that the effective density of the tube is the same as the density of a dielectric fluid 198 contained within the housing 154 between the diaphragm 172 and the disc 156. Similarly, the tapped opening 168 may be connected to an appropriate source of fluid under pressure, or it may be left open to the atmosphere, or it may be closed by an appropriate plug (not shown). In the latter case, the space between the closure 164 and the diaphragm may be either filled with an appropriate fluid under pressure, or it may be evacuated.

In order for the instrument 152 to operate, fluid under pressure must be introduced into the Bourdon tube 178 or within the space between the diaphragm 172 and the closure 164. This pressure will cause the movable end 180 to move, thereby shifting the contact 182 with respect to resistance layer 160. In the preferred mode of operating the instrument 152, fluid under pressure is introduced through the opening 168 so as to expand the diaphragm 172. This expansion will result in the Bourdon tube 178 being affected so that the movable end 180 is moved, thereby shifting the contact 182 with respect to the resistance layer 160. The contact 182 is electrically connected by a wire 202 to an appropriate terminal 200, which projects through the disc 156.

Those skilled in the art will recognize that the embodiments of the invention herein shown and described may be used to measure pressure from a single source, or as in the case of the constructions illustrated in FIGURES 2, 3, and 4 of the drawings, so as to obtain a differential pressure measurement between pressures of two different pressure sources.

Certain advantageous features of the invention derive from the fact that the pressure-responsive member, whether it be a bellows structure or a Bourdon tube, is immersed in a dielectric fluid which serves both to dampen any unwanted vibration and to protect the bellows unit against corrosion and dirt. The effects of acceleration and shock may be greatly minimized by using a dielectric fluid of substantially the same density as the effective density of the pressure responsive members. The instruments of this invention are very effective in this regard, and mark a substantial improvement over prior related instruments.

While I have shown and described in considerable detail three illustrative embodiments of the present invention, it will be understood by those skilled in the art that various changes may be made in the shape and arrangement of the several parts without departing from the scope of the invention, as defined by the claims.

I claim:

1. A pressure responsive instrument comprising a housing having an enclosed chamber filled with fluid, a first variable displacement means mounted within said chamber and having a fixed end attached to said housing for support, and a movable free end, means for introducing fluid under pressure into said variable displacement means so as to expand the same, a second variable displacement means mounted within said chamber and having a fixed end attached to said housing for support, and a movable free end, said second variable displacement means having a lower internal pressure than said first variable displacement means, whereby said second variable displacement means is compressed by fluid in said chamber displaced by expansion of said first variable displacement means, a first electrical means connected to and movable with the free end of said first variable displacement means, a second electrical means connected to and movable with the free end of said second variable displacement means, said first and second electrical means being cooperable to produce an electrical signal that is a function of the relative movement between them, said first and second electrical means being moved in opposite directions by their respective variable displacement means, whereby the total travel of one of said electrical means with respect to the other is substantially greater than the travel of said first electrical means with respect to said housing.

2. A pressure responsive instrument as defined in claim 1, wherein said first and second variable displacement means comprise a pair of bellows.

3. A pressure responsive instrument as defined in claim 1, wherein said second variable displacement means comprises an evacuated bellows.

4. A pressure responsive instrument as defined in claim 1, wherein said housing is provided with a partition dividing said chamber into two chambers, each of which contains one of said variable displacement means, said partition having a passageway extending through from one side thereof to the other, and throttling means in said passageway for damping the flow of fluid therethrough.

5. A pressure-responsive electrical instrument comprising:

first means, including first and second bellows means each having one end thereof sealed against passage of fluid and each being filled with a respective one of first and second fluids which fluids may be selected from the class of fluids including liquids, gases under pressure and gases under very low pressures, and each bellows being constructed and arranged for contraction and expansion incident to changes in relative internal and external pressures to which the respective bellows are subjected;

second means, comprising chamber-forming means constructed and arranged to provide first and second adjacent substantially fluid-tight chambers which chambers have voids filled by a third fluid and each chamber housing a respective one of said first and second bellows means, said second means providing a restricted passage interconnecting said first and second chambers, said second means comprising means for supporting said first and second bellows means and for controlling entry and exit of said first and second fluids under pressure to and from respective ones of said first and second bellows means, whereby upon admission of fluid under pressure into one of said bellows means the resultant expansion thereof induces flow of some of said third fluid from said first chamber through said passage into said second chamber and induces contraction of said second bellows means;

and third means, comprising first and second relatively movable devices each constructed and arranged to be moved relatively to the other incident to volumetric change of a respective one of said first and second bellows means, said relatively movable devices being constructed and arranged to produce a change in an electrical quantity incident to relative movement therebetween.

6. An instrument as defined by claim 5, said second means comprising means for adjusting the rate of flow of fluid through said passage.

7. A pressure-responsive electrical instrument, comprising:

first means, comprising a substantially fluid-tight housing having provisions for admission of fluid under pressure thereinto, said housing having fluid therein;

second means, disposed in said housing and comprising first and second relatively movable inductor means constructed and arranged to produce a change of inductance incident to relative movement therebetween, said inductor means comprising an inductor coil and an inductor core movable in the field of said coil;

third means, disposed in said housing and including a first pressure-sensitive cell having an interior surface and an exterior surface sealed from said interior surface and one of which surfaces is exposed to fluid in said housing, and means connecting said first pressure-sensitive cell to one of said first and second inductor means for movement thereof incident to volume-change of the said cell;

fourth means, disposed in said housing and including a second pressure-sensitive cell having first and second surfaces one of which is exposed to fluid admissible thereto under pressure and the other surface of which is sealed from the latter fluid and is exposed to said first-named fluid, and means connecting said second pressure-sensitive cell to the other of said first and second inductor means for movement thereof incident to volume-change of said second pressure-sensitive cell;

whereby to provide an augmented inductance-change signal incident to variations in pressure sensed by said cells.

8. A pressure-responsive electrical instrument according to claim 7, said housing including means dividing the interior thereof into two chambers, and means for permitting and variably restricting flow of fluid from one of said chambers to the other.

9. A pressure responsive electrical instrument comprising a substantially fluid-tight housing having ends; a member dividing said housing into two substantially closed chambers, said member having means defining a restricted passage in said member connecting said chambers; a first bellows mounted at one of said ends on said housing so as to project into one of said chambers; a second bellows mounted on said member and including a rod actuated thereby and arranged to project into the other of said chambers; means for introducing fluid under pressure into said second bellows; means permitting change of volume of said first bellows; a substantially incompressible fluid filling the unoccupied space in said chambers; inductor means comprising an inductor coil and an inductor core, and means connecting said coil to one of said bellows for movement thereby and means connecting said core to the other of said bellows for movement thereby, said connecting means including said rod, whereby to provide an inductance-change representative of a variation of pressure sensed by said bellows.

10. A pressure responsive electrical instrument as defined in claim 9, including valve means for controlling the effective size of said restricted passage.

References Cited in the file of this patent

UNITED STATES PATENTS

| | | |
|---|---|---|
| 1,272,344 | Bristol | July 9, 1918 |
| 2,461,635 | Feller | Feb. 15, 1949 |
| 2,720,113 | Statham | Oct. 11, 1955 |
| 2,785,570 | Mounteer et al. | Mar. 19, 1957 |

FOREIGN PATENTS

| | | |
|---|---|---|
| 1,059,647 | France | Nov. 10, 1953 |